Dec. 16, 1952     A. L. LUCE, JR     2,621,708
AISLE SEAT

Filed Nov. 9, 1949     2 SHEETS—SHEET 1

Inventor

Albert L. Luce, Jr.

By Clarence A. O'Brien
and Harvey B. Jacobson
Attorneys

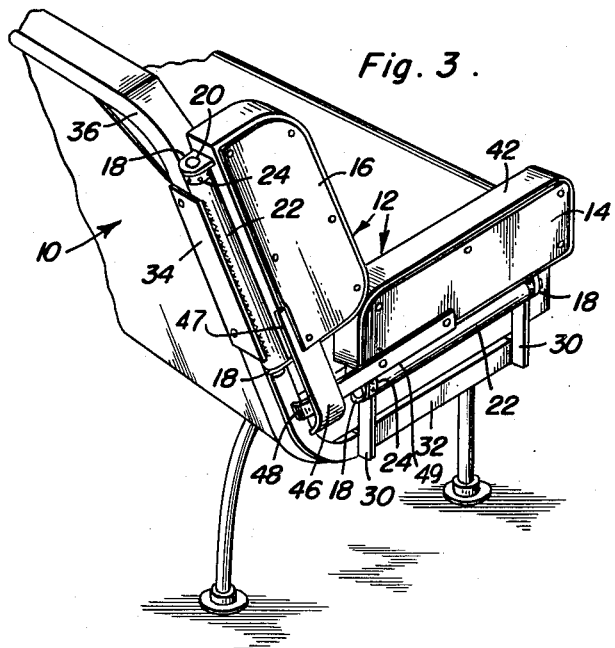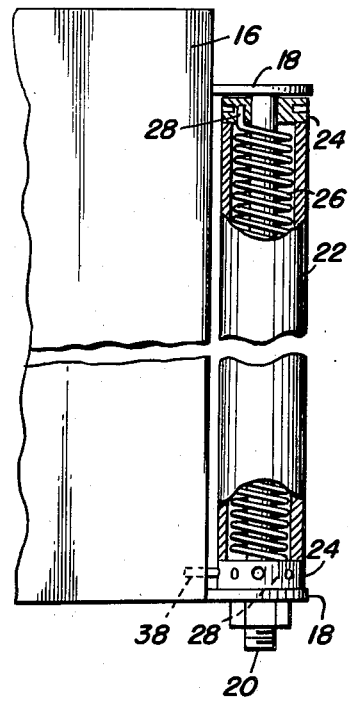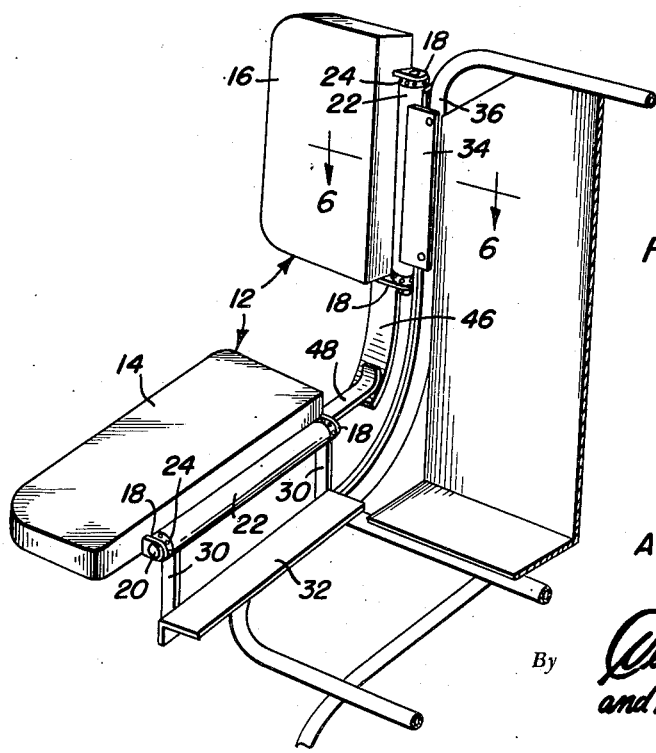

Patented Dec. 16, 1952

2,621,708

UNITED STATES PATENT OFFICE 2,621,708

AISLE SEAT

Albert L. Luce, Jr., Fort Valley, Ga.

Application November 9, 1949, Serial No. 126,289

1 Claim. (Cl. 155—33)

This invention relates to new and useful improvements and structural refinements in seats, and the principal object of the invention is to provide a device of the character herein described, which may be conveniently and effectively employed as an auxiliary seat in the aisle of a bus, an important feature of the invention residing in the provision of means for automatically folding or collapsing the auxiliary seat as soon as its occupant rises, so that the auxiliary seat does not interfere with the passage of persons through the aisle.

Although the invention is particularly adapted for use in a bus it may, of course, be also employed in any other similar vehicle or, for that matter, in a stationary establishment such as a theatre, auditorium and the like.

Some of the advantages of the invention reside in its simplicity of construction, in its automatic operation, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 3 is a fragmentary rear perspective view illustrating one side of the invention.

Figure 4 is a fragmentary front perspective view of the subject shown in Figure 3, but illustrating the auxiliary seat member and back rest member in their projected positions.

Figure 5 is a fragmentary elevational view, partially broken away, showing a typical arrangement of a hinge used in the invention.

Like characters of reference are employed to designate like parts in the specification and throughout the several views.

Figure 1:
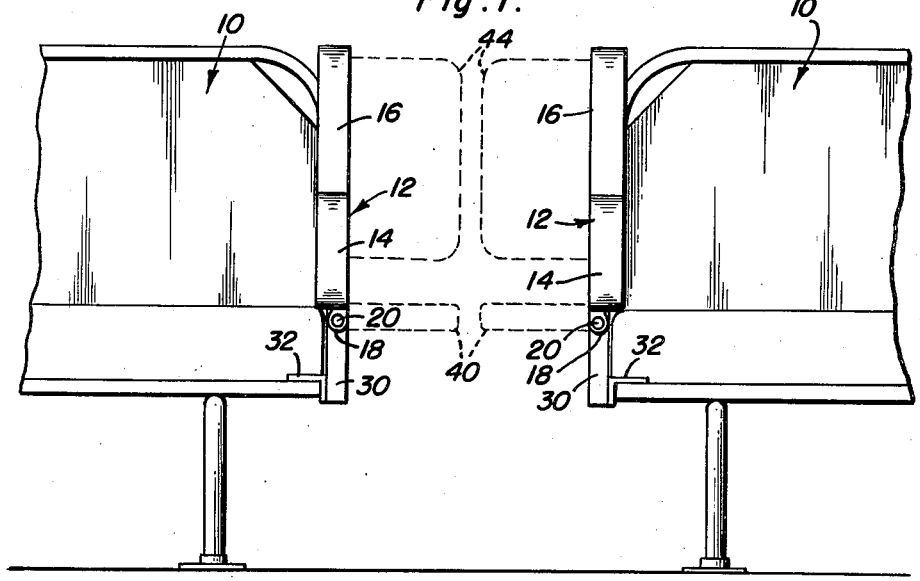
Figure 1 is a front elevational view of the invention installed in an aisle between two conventional seats.
Figure 2:
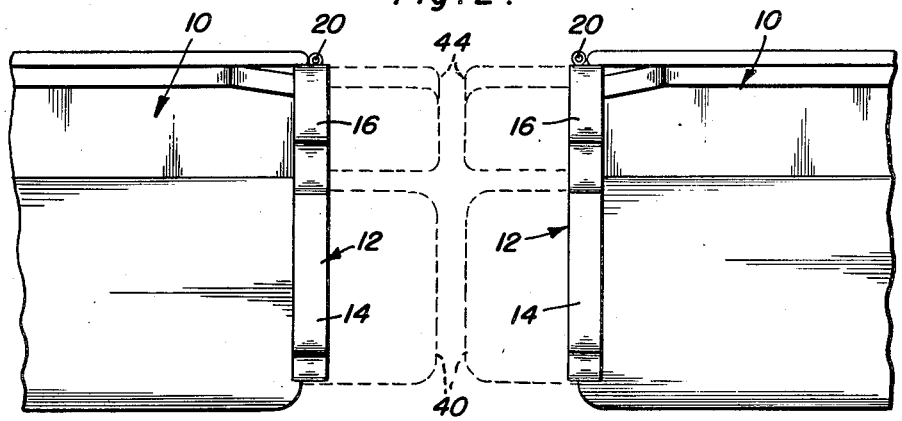
Figure 2 is a top plan view of the subject shown in Figure 1.
Figure 6:
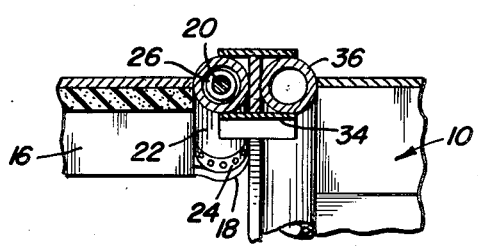
Figure 6 is a fragmentary cross-sectional view taken substantially in the plane of the line 6—6 in Figure 4.

Referring now to the accompanying drawings in detail, the invention consists of an auxiliary seat adapted for use in an aisle afforded between a pair of spaced, juxtaposed conventional seats 10, the aisle seat comprising a pair of complemental units 12 each of which is mounted on one of the main seats 10 as will be presently described.

Inasmuch as the construction and operation of these two units is the same, apart from the fact that the units are of "opposite hand," it is believed that a description of one unit will suffice for both.

Each of the units 12 consists of a seat member 14 and a back rest member 16, the member 14 being provided at one edge thereof with a pair of spaced brackets 18 while corresponding brackets are provided on the back rest member 16, as is best illustrated in Figure 5.

A shaft 20 extends through each pair of the brackets 18 and carries a tubular housing 22 provided in the ends thereof with a pair of collars 24, and a helical spring 26, positioned in the housing 22 on the shaft 20, has the opposite ends thereof anchored in the collars 24 as indicated at 28.

The housings 22 of the respective members 16, 14, are rigidly secured to the frame of the main seat 10, for example, the housing of the member 14 may be secured by a pair of strips 30 to the usual, substantially horizontal side member 32 of the seat frame, while the housing of the back rest member 16 may be rigidly secured by an I-beam or channel 34 to the usual upwardly and rearwardly extending side rail 36 of the seat frame, as shown.

In this manner the housings 22 are non-rotatable as is one of the collars 24 which is rigidly secured (by welding or the like) to the housing while the second collar at the relatively opposite end of the housing is rotatable and is provided with a laterally projecting pin 38 (see Figure 5) bearing against the associated member 14 or 16, as the case may be. The shaft 20, of course, functions in the manner of a hinge pin, and the arrangement of the spring 26 is such that the seat forming member 14 is normally urged from a laterally projected position illustrated at 40, in an upward swinging direction to a folded or collapsed position against the end of the main seat 10, in which position an upper edge 42 of the member 14 functions as a convenient arm rest for the main seat. This is best illustrated in Figure 3, while the projected operative position of the member 14 is best illustrated in Figure 4.

Similarly, the back rest member 16 is swingable forwardly from a laterally projected position as shown at 44 to a folded or collapsed position against the end of the seat, it being noted that when the members 14, 16 are laterally projected from the two adjacent seats 10, they afford an auxiliary seat, including a back rest, in the aisle between the seats 10, as will be clearly apparent from the accompanying drawings. However, when the members 14, 16 are folded against the ends of the seats 10, the aisle remains unobstructed.

It is to be also noted that a strap 46 extends downwardly from the back rest member 16 and has a forwardly arcuated lower end portion, while a second strap 48 extends rearwardly from the seat member 14 and has an upwardly arcuated rear portion which is in frictional operative engagement with forwardly arcuated lower portion of the strap 46.

Accordingly, when the invention is placed in use, a prospective occupant of the auxiliary seat simply swings the seat members 14 downwardly to their projected positions during which action the straps 48, engaging the straps 46, will automatically swing the back rest members 16 rearwardly, thus rendering the auxiliary seat in readiness for occupancy. However, the weight of the occupant on the seat members 14 will retain, through the medium of the straps 48, 46, the back rest members 16 in their operative positions until such time as the occupant rises and the springs 26 in the housings 22 of the members 14, 16 will automatically swing these members to their folded positions against the ends of the respective seats 10.

When the back rest members 16 are swung rearwardly to their operative positions, exposed portions 47 of the straps 46 will abut the outer side edges of the channels 34 so as to limit the rearward swinging movement of the back rests. Similarly, when the seat members 14 are swung downwardly to their operative positions, edges 49 of the straps 48 will abut the rear strips 39, thus limiting downward swinging of the seat members.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

The combination of a supporting frame including a substantially horizontal member having front and rear ends and an upwardly extending member rigid with the rear end of the horizontal member, front and rear upstanding strips secured to the horizontal member, a horizontal hinge unit attached to the upper ends of said strips, a seat connected to said hinge unit and swingable from an operative horizontal position to an upwardly folded inoperative position, a strap secured to the underside of said seat and projecting rearwardly therefrom, said strap being engageable with the rear strip to limit downward swinging of the seat, a channel secured to said upwardly extending member, a second hinge unit secured to said channel, a back rest connected to the last-mentioned hinge unit and swingable from a laterally projected operative position to a forwardly folded inoperative position, and a tongue secured to said back rest and projecting downwardly therefrom to operatively engage said strap whereby the back rest may be swung simultaneously with said seat, said tongue being engageable with said channel to limit outward swinging of the back rest, and resilient means in said hinge units for urging the seat and the backrest to their folded positions.

ALBERT L. LUCE, Jr.

REFERENCES CITED

The following references are of record in the file of this patent:

UNITED STATES PATENTS

| Number | Name | Date |
|---|---|---|
| 330,223 | Gaylord | Nov. 10, 1885 |
| 330,231 | Hall et al. | Nov. 10, 1885 |
| 2,018,983 | Van Derveer | Oct. 29, 1935 |
| 2,035,452 | Bell | Mar. 31, 1936 |

FOREIGN PATENTS

| Number | Country | Date |
|---|---|---|
| 37,174 | France | July 8, 1930 |
| | (1st Addition of 670,742) | |
| 818,617 | France | June 21, 1937 |